United States Patent [19]
Doherty et al.

[11] Patent Number: 5,365,283
[45] Date of Patent: Nov. 15, 1994

[54] COLOR PHASE CONTROL FOR PROJECTION DISPLAY USING SPATIAL LIGHT MODULATOR

[75] Inventors: Donald B. Doherty, Irving; Richard C. Meyer, Plano; Stephen W. Marshall, Richardson; Jeffrey B. Sampsell; Robert J. Gove, both of Plano, all of Tex.

[73] Assignee: Texas Instruments Incorporated, Dallas, Tex.

[21] Appl. No.: 93,537

[22] Filed: Jul. 19, 1993

[51] Int. Cl.⁵ .......................... H04N 9/14; H04N 9/47
[52] U.S. Cl. ..................... 348/743; 348/514; 348/520
[58] Field of Search ....................... 358/58, 60, 17, 149, 358/148, 158, 64, 150; 348/743, 742, 744, 745, 747, 750, 758, 760, 776, 779, 791, 781, 785, 786, 756, 514, 513, 512, 516, 517, 520, 503, 504, 524, 539, 537, 536, 540, 541, 542, 546, 547, 548, 551, 500; H04N 9/14, 9/43, 5/72, 9/47, 9/31

[56] References Cited

U.S. PATENT DOCUMENTS

| | | | |
|---|---|---|---|
| 3,821,793 | 6/1974 | Carson | 358/58 |
| 4,197,559 | 4/1980 | Gramling | 358/58 |
| 4,203,135 | 5/1980 | Sasaki | 358/149 |

FOREIGN PATENT DOCUMENTS

| | | | |
|---|---|---|---|
| 58-088985 | 5/1983 | Japan | 358/58 |
| 2132387 | 7/1985 | United Kingdom | 358/58 |
| 1262745 | 10/1986 | U.S.S.R. | H04N 9/12 |

OTHER PUBLICATIONS

T. J. Dennis, "Field-Sequential Colour Television Receiver", Wireless World, vol. 77, No. 1431, Sep. 1971.

Primary Examiner—Mark R. Powell
Assistant Examiner—Safet Metjahic
Attorney, Agent, or Firm—Julie L. Reed; James C. Kesterson; Richard L. Donaldson

[57] ABSTRACT

A SLM-based projection display system (10) samples and processes video data for delivery to a spatial light modulator (SLM) (13c), and uses a color wheel (14a) to color the SLM-generated images. A frame memory (13b) provides data to the SLM (13c) and is managed so that, if the phase of the incoming video signal changes, a desired phase relationship between the color wheel position and the data available to the SLM (13c) can be maintained. Also, a motor control unit (15a) uses a horizontal sync signal to generate a drive signal for the color wheel motor (16a), which limits the transient time during phase-changing events, and which provides a means for adjusting the phase of the drive signal.

9 Claims, 3 Drawing Sheets

COLOR PHASE CONTROL FOR PROJECTION DISPLAY USING SPATIAL LIGHT MODULATOR

TECHNICAL FIELD OF THE INVENTION

This invention relates to image display systems, and more particularly to a projection display system that uses a spatial light modulator, a white light source, and a color wheel.

BACKGROUND OF THE INVENTION

Spatial light modulators (SLMs) are increasingly used in projection display applications. A DMD is a type of SLM having an array of micro-mechanical mirror elements, each individually addressable by electronic data. Depending on the state of its addressing signal, each mirror element is moved so that it either does or does not reflect light to an image plane.

For SLM-based display applications, the incoming video signal must be converted to binary data in a form useable by the SLM. As a result of being converted from analog to digital form, the data is first arranged pixel-by-pixel, row-by-row, and frame-by-frame. If the data was interlaced, the data may also require scan conversion from fields to frames. For example, a DMD displays one bit per mirror element at a time. In other words, the image reflected by the DMD at any one moment represents a set of bits having the same binary weight. Thus, before delivery to the SLM, the data must be reformatted into "bit-planes". For pixels having an n-bit resolution, there are n bit-planes per image frame.

U.S. Pat. No. 5,278,652, entitled "DMD Architecture and Timing for Use in a Pulse-Width Modulated Display System", describes a type of DMD-based projection display system. It also describes a method of formatting video data for use with such a system, and a method of modulating bit-planes to provide varying intensity.

Color images are generated from bit-planes representing different colors. As an example, video data might have 24 bits of data per pixel. Assuming that the colors are red, green, and blue, of these 24 bits, 8 bits would be red data, 8 bits for green, and 8 bits for blue. One complete video frame would be comprised of 24 bit-plane images.

One technique for providing a color image is to use a white light source and a color filter in front of the SLM. In one such design, the white light illuminates the SLM, and the color filter is placed between the SLM and the image plane, so that the image reflected from the SLM is filtered with that color. In another such design, the color filter is placed between the white light source and the SLM.

A common implementation of the color filter approach is to temporally filter the light with a motor-driven "color wheel" having a red section, a blue section, and a green section. As the wheel rotates, red, blue, or green data is transmitted through the corresponding section. The colors of the final image depend on the bit-plane data for each color. U.S. Pat. No. 5,233,385, entitled "White Light Enhanced Color Field Sequential Projection", describes the use of a color wheel for a DMD-based projection display system.

In color wheel applications, the rotational speed and phase of the color wheel and the timing of the image data being reflected from the SLM must be synchronized. In other words, the color wheel must rotate so that the data is transmitted through the correct color at the correct time.

One difficulty of providing a properly synchronized color wheel is that a change from one video signal to another generally results in a change in color phase. Even if the new data is at the same frequency as the old data, the phase changes. For example, in a television system, the viewer may change channels, such that processed blue data from the new channel is available to the SLM at the time as processed red data from the old channel would have been available. As a result, unless the data and the color wheel are re-synchronized, the blue data would be present in the SLM while the red part of the color wheel is in front of the SLM.

One existing technique for re-synchronizing the data and color wheel is to drive the color wheel with a high-torque motor, which can quickly accelerate or decelerate the color wheel to adjust its phase. However, these high-torque motors are expensive.

SUMMARY OF THE INVENTION

A first aspect of the invention is a memory for a display system that uses a SLM and a motor-driven color wheel, which has differently colored filters, to display images from processed video data. A memory stores the processed data in a form ready for delivery to the SLM. The memory has a separately addressable section for storing data representing each color to be displayed by the DMD, such that data from a selected section may by read from the memory at a given instant. A pointer control unit generates a read pointer that represents an address in the memory from where data is to be read out. The pointer control unit determines the section of the memory to be currently read and the timing of the reading in response to a feedback signal from the color wheel motor that indicates the phase of said color wheel with respect to the video data in the SLM.

A technical advantage of the memory is that it synchronizes the color wheel and the display. Phase differences between the color wheel and the data available to the SLM can be resolved by controlling the read pointer. The color wheel motor is required only to drive the color wheel at a constant rate of revolutions per unit of time.. There is no requirement for speeding up or slowing down the motor to resolve phase differences. Thus, a much less expensive motor can be used. Also, the transient time for achieving synchronization is minimized. For television applications, after a channel change, the data available to the SLM is quickly re-synchronized with the position of the color wheel. In television, as well as other applications, quick re-synchronization reduces undesired artifacts in the image.

Another aspect of the invention is a color wheel motor control unit for a display system that uses a motor-driven color wheel to display frames of color images from processed data sampled from a video signal. A phase-locked oscillator receives a horizontal sync signal of the video signal, and generates a pulsed signal having a frequency of said horizontal sync signal times a predetermined multiplier. A first divide-by-n counter receives the pulsed signal from the phase-locked oscillator, and divides the frequency of the alternating signal by the number of lines in each frame, such that it generates a frame-pulsed signal, which is equal to the frame length times the predetermined multiplier. A second divide-by-n counter receives the frame-pulsed signal, and divides this signal by a predetermined divider, such that it generates a square waveform having a period equal to the frame length. This signal may be used to drive a synchronous alternating current color wheel motor.

The use of the horizontal synchronization signal to drive the synchronous color wheel motor limits the time during which its drive signal is disrupted as a result of a phase-changing event, such as a channel change in television applications. This is because the disruption between horizontal sync pulses is much smaller than the disruption between vertical sync pulses and because the phase-locked oscillator/divider maintains the motor drive waveform during horizontal re-synchronization. It also permits the phase of the color wheel to be incrementally adjusted, which permits various memory management techniques that maximize use of memory space.

DETAILED DESCRIPTION OF THE INVENTION

U.S. Pat. No. 5,278,652, entitled "DMD Architecture and Timing for Use in a Pulse-Width Modulated Display System" describes a type of DMD-based projection display system, but without the features of the present invention, and is incorporated herein by reference. It also describes a method of formatting video data for use with such a system, and a method of modulating bit-planes to provide grey-scale images. The general use of a DMD-based projection system with a color wheel to provide sequential color images is described in U.S. patent Ser. No. 07/809,816, entitled "White Light Enhanced Color Field Sequential Projection" and incorporated herein by reference.

Figure 1:
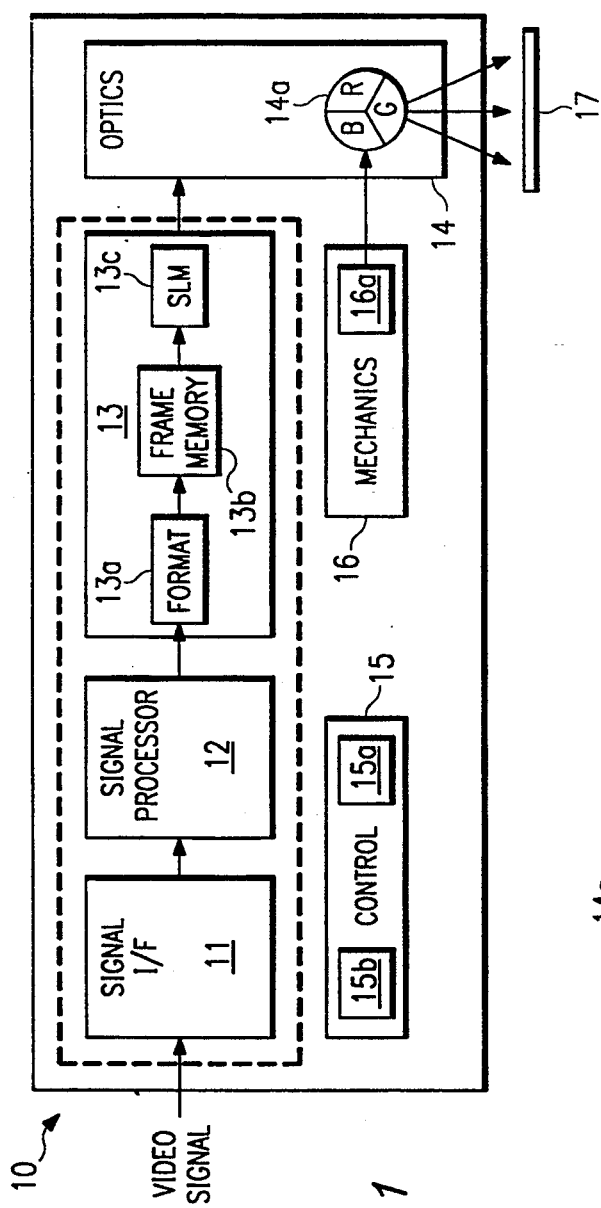
FIG. 1 is a basic block diagram of a SLM-based projection display system, which has both a frame memory and a motor control unit in accordance with the invention.

FIG. 1 is a block diagram of a SLM-based projection display system 10, which provides color images from pixel data sampled from a video signal. The video signal may be any signal from which pixel data can be sampled. For example, the video signal could be a television broadcast signal, which can be sampled and converted to RBG data. The video signal might also be an RBG signal from a source such as a computer, or on a digital signal. In any event, a common characteristic of the various types of video signals is the presence of a vertical and a horizontal synchronization (sync) signal and a component from which digital color data can be sampled. For purposes of this description, an analog signal is assumed.

As an overview of system 10, signal interface unit 11 receives the video signal and generates analog video and synchronization signals to the signal processing unit 12. The video signals from interface unit 11 may be either interlaced signals or noninterlaced signals, and may represent either RBG data or luminance/chrominance data.

Signal processor unit 12 converts the analog video signal into a digital video signal. It may also add features such as picture-in-picture and on-screen display. In general, signal processor unit 12 conditions the data for display and provides central timing for the system 10. If the data is interlaced, signal processing unit 12 also provides scan conversion from fields to frames.

Display electronics unit 13 reformats the digital video data in a data formatter 13a, which formats bit-planes of data for implementation of sequential color images. Details of a suitable data formatter 13a can be found in U.S. Pat. No. 5,255,100, entitled "Data Formatter with Orthogonal Input/Output and Spatial Reordering", and incorporated by reference herein. A frame memory 13b stores frames of image data for delivery to SLM 13c, and is managed in accordance with the invention described herein. SLM 13c may be any type of SLM. Although this description is in terms of a DMD type of SLM, any other type of SLM could be substituted into the apparatus and used for the method described herein. Details of a suitable DMD 13c can be found in U.S. Pat. No. 4,956,619, entitled "Spatial Light Modulator" to Hornbeck and incorporated by reference herein.

Display optics unit 14 receives the image from SLM 13c, and provides a display image to an image plane such as a display screen 17. A color wheel 14a rotates such that each bit-plane is transmitted through a corresponding color filter. For purposes of this description, color wheel 14a corresponds to red, green, and blue color data, but other colors could be used.

Control unit 15 provides various system control functions. It has a pointer control unit 15a for synchronizing the timing of data available to SLM 13c with the position of color wheel 14a, as explained below in connection with FIGS. 2–4. It also has a motor control unit 15b for providing a drive signal, DS, to motor 16a, as explained below in connection with FIGS. 6 and 7. The design and operation of pointer control unit 15a and motor control unit 15b are independent; a projection display system 10 could be implemented with either or both.

Mechanical unit 16 provides various mechanical system functions. It has a motor 16a for driving color wheel 14a.

Figure 2:
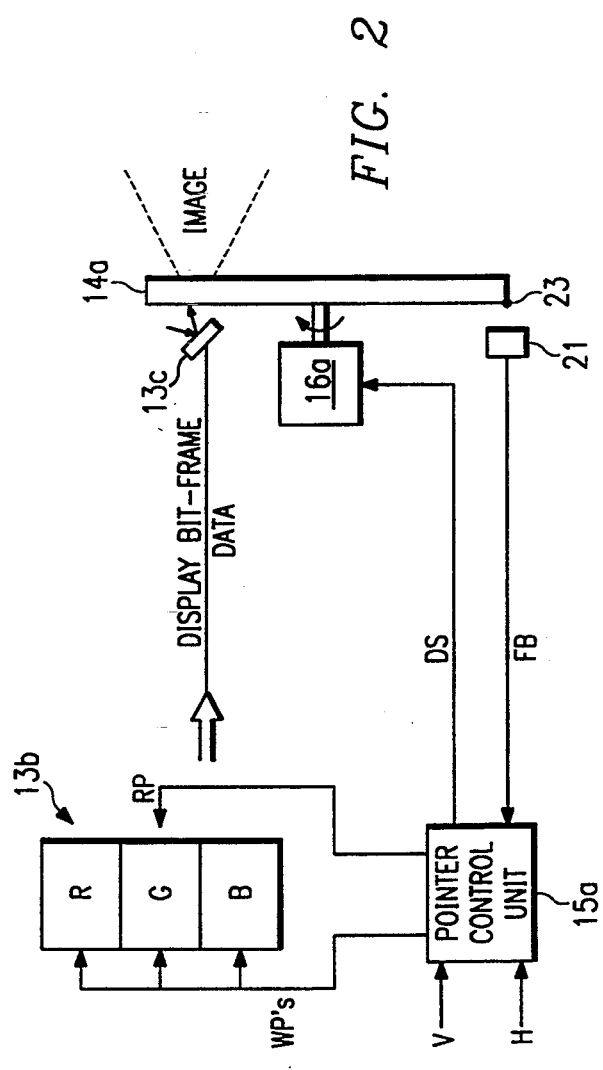
FIG. 2 illustrates the pointer control unit of FIG. 1 and its interconnections with the frame memory and the color wheel.

FIG. 2 illustrates pointer control unit 15a and its relationships to a frame memory 13b, SLM 13c, color wheel 14a, and color wheel motor 16a.

A basic concept of the design of FIG. 2, is that color phase changes are re-synchronized by controlling how data is read from memory 13b instead of by changing the phase of color wheel 14b. As explained in the background section above, these phase changes may occur for various reasons, such as a result of changing television channels.

Frame memory 13b has three sections, one for each color. For purposes of this description, which uses the example of 24-bit pixel data, it is assumed that frame memory 13b provides 24 bit-planes for each image frame, which includes 8 bit-planes for each color, in "display-ready" format. In other words, the data read out of frame memory 13b is formatted such that all color conversion, scan conversion, and other processing has occurred. On output, each bit-plane is ready for display by SLM 13c. During a frame period, which for purposes of example herein is every 1/60 second, these 24 bit-planes are displayed by SLM 13c and comprise one "image frame". Depending on the organization of frame memory 13b, the formatting into DMD display-ready bit-planes may occur either before input, on input, or on output. The formatting of data into bit-planes and the writing in and reading out of data to a frame memory for SLM display is discussed in the U.S. patents and patent applications discussed above.

The portion of frame memory 13b allocated for the bit-plane data of each bit having the same binary weight, is referred to herein as a "plane" of memory 13b. In general, memory 13b operates as a first-in, first-out buffer, such that bit-planes are read out from their memory planes to SLM 13c in the same order as they are written in. As explained below in connection with FIG. 3, each memory plane actually has a write buffer and a read buffer, which are "toggled" so that one may be written while the other is read. This technique is sometimes also referred to as "ping-ponging" the buffers.

A write pointer, WP, is used to write data into frame memory 13b at a rate consistent with the source video signal. Typically, all three sections of memory 13b are controlled by this write pointer, such that three memory planes, one for each color, simultaneously receive a bit-plane of data. The vertical sync signal may be used to control the write pointer such that frames are written to memory at the same average rate as the incoming video data is received by the projection system.

A read pointer, RP, is used to read data out of frame memory 13b to SLM 13c at the same average rate as it is written in. As explained below, this read pointer is controlled so that reading is synchronized to the phase of color wheel 14a.

SLM 13c receives data from frame memory 13b, one bit-plane at a time. SLM 13c is positioned at a fixed point such that color wheel 14a filters light reflected from SLM 13c to image plane 17. SLM 13c reflects white light from a source (not shown), with an image being formed by the positioning of its mirror elements. The reflected light is filtered through color wheel 14a, and the color-filtered image is projected onto the image plane 17. As color wheel 14b rotates, the image plane 17 is illuminated with the color that is currently in front of the SLM 13c. As indicated in the background, the color wheel 14a could also be placed between the white light source and SLM 13c, and the invention described herein would be applicable.

Figure 3:
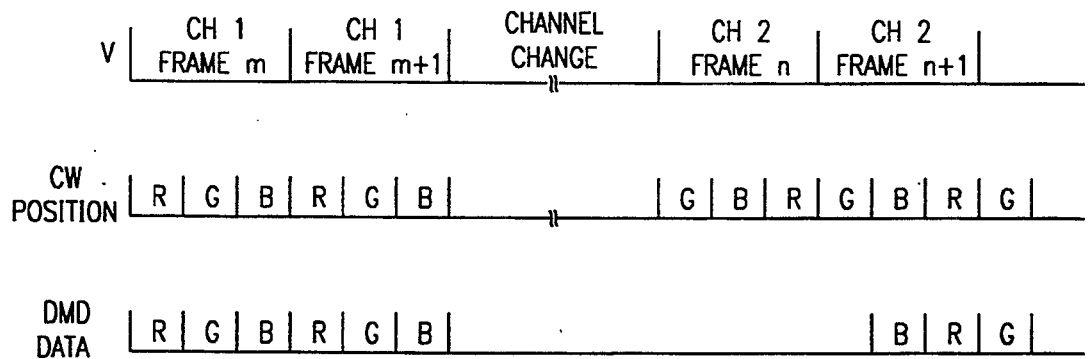
FIG. 3 illustrates the phase relationships between the vertical sync signal, the position of the color wheel, and the data being displayed by the SLM, before and after a phase changing event.
Figure 4:
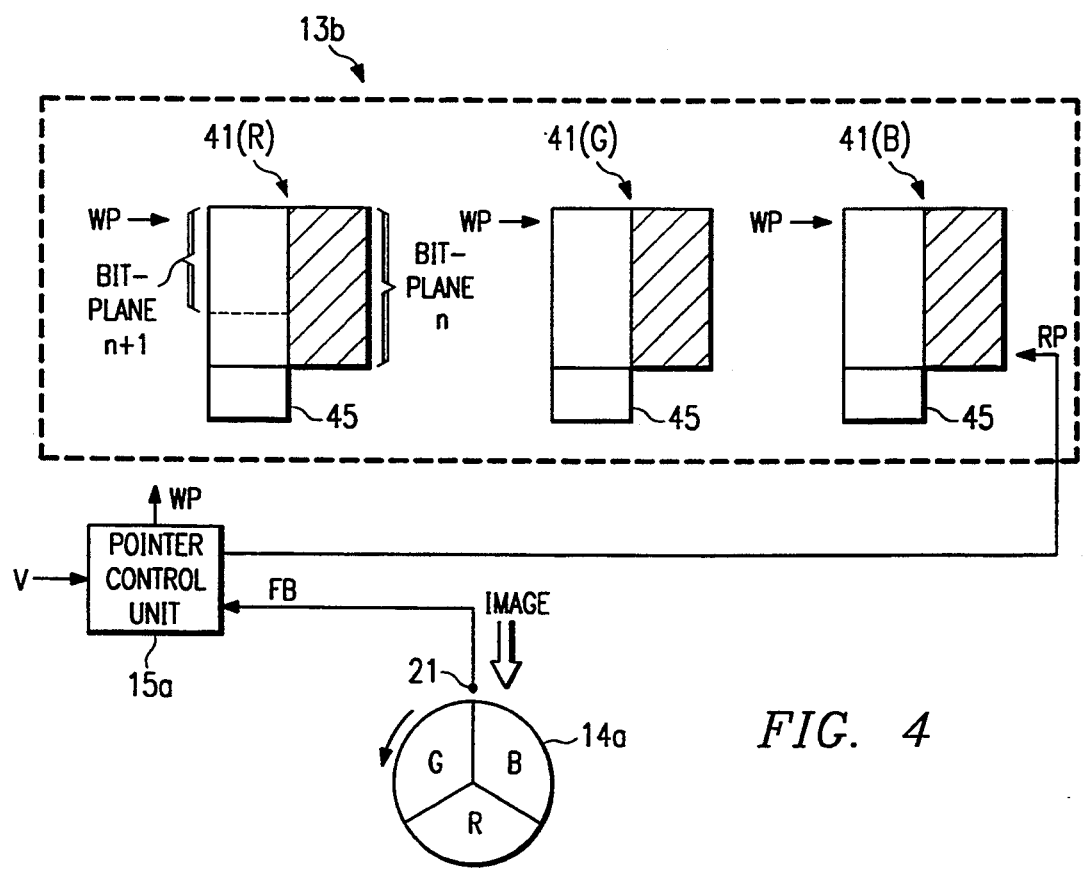
FIG. 4 illustrates how the pointer control unit is used to maintain an in-phase relationship between the color wheel and the data displayed by the SLM.

For the implementation of FIGS. 2–4, color wheel motor 16a may be any type of motor that drives color wheel 14b at a constant speed. For purposes of this description, it is assumed that this speed is consistent with the image frame rate of 60 frames per second, and is thus 60 revolutions per second.

Referring again to FIG. 1, color wheel 14a has a color boundary, B, at each boundary between different colors. As shown in FIG. 2, detector 21 is placed near color wheel 14a, such that it senses a marker 23 on one of these boundaries as color wheel 14a rotates. Detector 21 generates a signal for every revolution of color wheel 14a, which it delivers to timing generator 15a. This permits timing generator 15a to determine when each boundary passes a fixed reference point.

The relationship between the data delivered to SLM 13c and the position of color wheel 14a is referred to herein as a "color-phase" relationship. The data and the color wheel 14a are "in phase" if all bit-planes for one color are displayed by SLM 13c while that color section of color wheel 14a passes in front of SLM 13c.

Where a "frame period" represents the period of time between vertical sync pulses, color wheel 14a rotates once per frame period. For a 24-bit pixel data, color wheel 14a rotates one revolution while all 24 bit-planes are displayed by SLM 13c.

Timing generator 15a generates a motor drive signal, DS, which it delivers to drive motor 16a, to drive color wheel 14b at a constant speed in revolutions per second. Timing generator 15a also generates the write pointer, WP, and the read pointer, RP, to control the data flow in and out of frame memory 13b.

FIG. 3 illustrates the phase relationships between the vertical sync signal, V, the position of color wheel 14a, and the data displayed by SLM 13c, before and after a phase changing event. For purpose of example, the change in phase is illustrated as having been caused by a discontinuity in the vertical sync signal caused by changing channels of a television signal.

Before the channel change, the vertical sync signal, color wheel 14a, and the data are all in phase, with the vertical sync signal corresponding to each blue-red border of color wheel 14a and with the beginning of red data.

After the channel change, the vertical sync signal and the color wheel 14a are no longer in phase, in the sense that the vertical sync signal and the beginning of a color wheel revolution do not necessarily match. If the data for the first frame of the new channel were read out to SLM 13c at the beginning of the vertical sync signal, the data and the color wheel 14a would not match. In other words, the data and the color wheel 14a would be out of phase, However, as indicated, the in-phase relationship between the color wheel position and the data being displayed by DMD 13b is maintained.

FIG. 4 illustrates how frame memory 13b is managed to maintain an in-phase relationship between color wheel 14a and the data displayed by SLM 13c. A single memory plane 41 for each R, G or B section of memory 13b is shown, but it should be understood that each R, B, or G section has as many planes as there are bits for that color. In the 24-bit pixel example of this description, each R, B, or G section has 8 memory planes 41.

A feature of frame memory 13b is that any of its R, G or B sections can be independently accessed to begin reading out a bit-plane to SLM 13c. For example, when the red boundary of color wheel 14a reaches an appropriate point, pointer control unit 15a may direct the read pointer, RP, to read out the red bit-planes from the red section of memory 13b. The reading is then repeated for the green and blue sections. After the blue bit-planes are read from the blue section, the read pointer returns to the red section.

Each memory plane 41 has space allocated for a read buffer and a write buffer. The write buffer is written with bit-plane data while a prior bit-plane is being read out from the read buffer. After the read buffer is read out, the write pointer and read pointer are "toggled" so that the write buffer becomes the read buffer and vice versa. Also, each memory plane 41 has a write overflow space 45.

In FIG. 4, for each memory plane 41, the shaded area is the current read buffer and the non-shaded area is the current write buffer. The read buffers contain an entire bit-plane n. A blue bit-plane is about to be read, as indicated by the position of the read pointer. The write buffers are being written with bit-plane n+1. The overflow area 45 is available to the current write buffer. After the buffers are toggled, the write overflow area 45 is available to what is now the current write buffer.

Sensor 21 is placed with respect to SLM 13c such that there is a known time relationship between a reference boundary and the position of the image from SLM 13c. In a simple embodiment, sensor 21 could be placed such that it senses the reference boundary when that boundary passes in front of SLM 13c.

In operation, sensor 21 detects the reference boundary, and delivers a feedback signal to pointer control unit 15a. From that information, control unit 15a determines when any next boundary will be reached. Alternatively, each boundary on color wheel 14a could be detected to provide a unique signal when it passes sensor 21. In any event, pointer control unit 15a generates a read pointer to the appropriate section of memory 13b at the appropriate time.

In FIG. 4, after the phase-changing event of FIG. 3, color wheel 14a has moved to a position where its next boundary, the green-blue boundary, is in front of SLM 13c, as detected by sensor 21. In response, sensor 21 sends a signal to control unit 15a, which moves the read pointer to a plane 41 of the blue section of memory 13b so that blue data will be available to SLM 13c while the blue part of the color wheel 14a is in front of SLM 13c. Meanwhile, the reading out of data has been delayed for the time required to write in one frame of the new channel data plus the time that it took for color wheel 14a to advance to the greenblue boundary.

For each memory plane 41, the capacity of the write overflow portion 45 is at least $\frac{1}{3}$ bit-plane. Thus, the portion of each memory plane 41 allocated for writing in data has a capacity of at least $1\frac{1}{3}$ bit-plane. This accommodates the "worst case" situation, when a boundary has just passed the image display, and $\frac{1}{3}$ frame period expires before a new boundary is reached. In this situation, writing will continue for $\frac{1}{3}$ frame period before reading is resumed.

Figure 5:
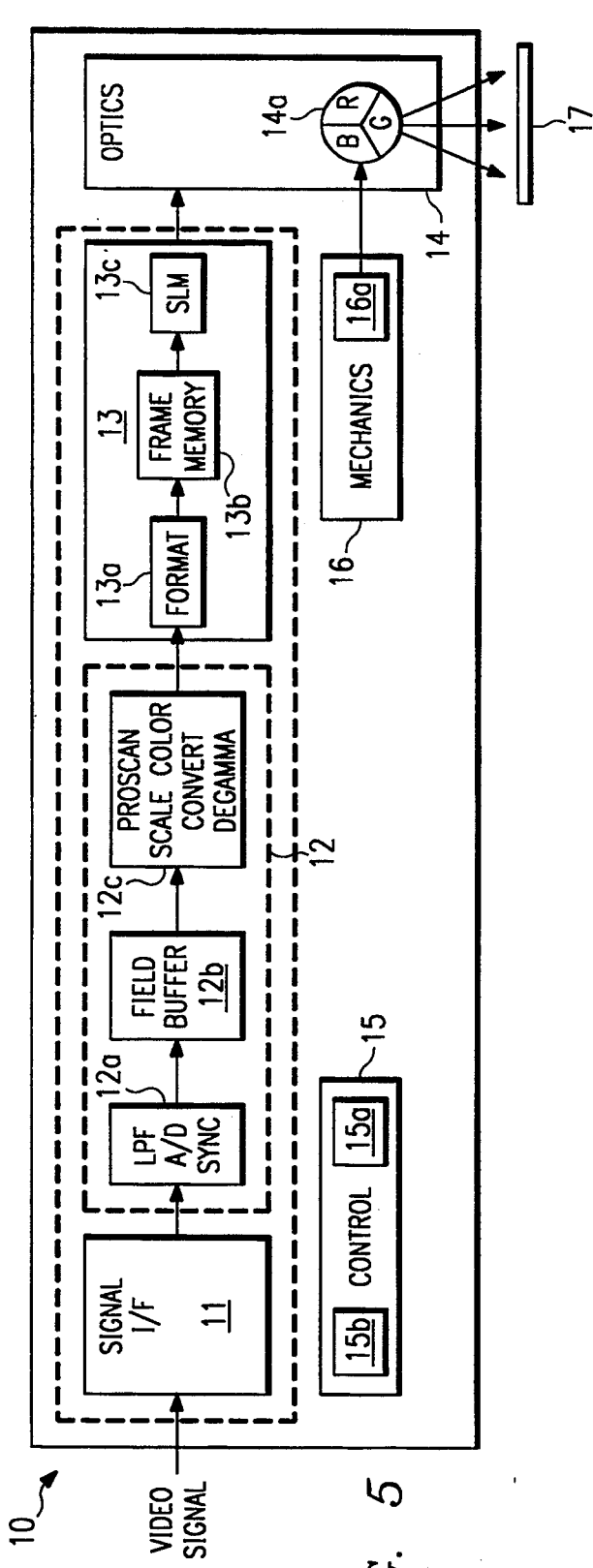
FIG. 5 illustrates a field buffer that can be managed in accordance with the invention.

FIG. 5 illustrates processor unit 12 in further detail. Processing tasks are divided into two functional units 12a and 12c, and field buffer 12b is in the data path between them. Field buffer 12b is used to provide an image during the time that the color wheel is not synchronized, and also performs a "field spreading" function. As an alternative to managing frame memory 13b as discussed above to provide color wheel synchronization, field buffer 12b could be managed in a similar manner. This alternative is especially useful when the video signal is interlaced, because the field buffer 12b is typically smaller and less expensive than the frame buffer 13b and its size may be increased with less cost.

Referring again to FIG. 3, a brief discontinuity of the position of color wheel 14a, matching the period of time during which the vertical sync signal is disrupted, is assumed. In practice, one means for driving the motor 15a for color wheel 14a is to use the vertical sync signal. Thus, a phase changing event will result in a transient period, during which motor 15a has a loss of its drive signal and after which motor 15a must be re-synchronized to the vertical sync signal. During this time, the displayed image may be distorted or other means used to blank the display.

Figure 6:
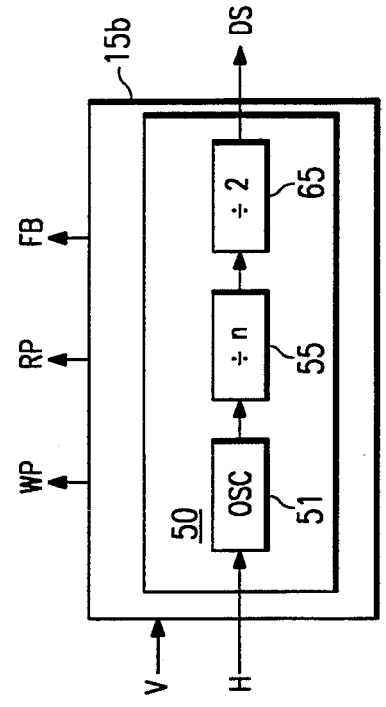
FIG. 6 illustrates the motor control unit of FIG. 1 and its interconnections with the horizontal sync signal and the color wheel motor.

FIG. 6 illustrates a motor control unit 15b, which derives a drive signal from the horizontal sync signal. As will be explained below, this reduces the transient effect on the position of the color wheel 14a during a phase changing event, as well as permits the phase of the color wheel to be incrementally adjusted.

Although motor control unit 15b is described herein for use in a SLM-based projection system 10, it could be used with any other type of video display system that receives a horizontal sync signal and uses a color wheel. For example, motor control unit 15b could be implemented in a raster scan display system.

Motor control unit 15b has an oscillator 61, which receives the horizontal sync signal. In the example of this description, the horizontal sync signal represents 525 lines per frame. As explained below, oscillator 61 multiplies the signal by a predetermined frequency multiplier so that divide-by-n counters 65 will generate a square wave. In this example, oscillator 61 runs at four times the frequency of the horizontal sync signal, to generate a first pulsed signal. Typically, oscillator 61 is a voltage controlled oscillator for provided a pulsed output.

A divide-by-n counter 55 receives the pulsed signal from oscillator 51. It divides the signal by the number of lines per frame. Thus, in the example of this description, n=525. The result is a "frame-pulsed" signal, having a frequency equal to that of the vertical sync signal times the frequency multiplier of oscillator 61.

A second divide-by-n counter 65 then divides the signal by some predetermined frequency divider that is one-half the multiplier of the oscillator 61. In this example, where the multiplier is 4, the n value of counter 65 is 2. The resulting square wave is symmetrical, and has a frequency of 60 cycles per second, which matches the 60 frames per second frequency of the vertical sync signal. This square wave may be amplified or otherwise conditioned to drive a single phase alternating current motor 16a.

Although not shown in FIG. 6, control unit 60 could also be used to provide a pair of drive signals for a quadrature phase motor. In this case, oscillator 51 would have a frequency of eight times that of the horizontal sync signal. Counter 65 could be a divide-by-four Johnson counter for the two output signals, each having a frequency of 60 cycles per second, but having a one-half cycle phase difference with respect to each other.

Figure 7:
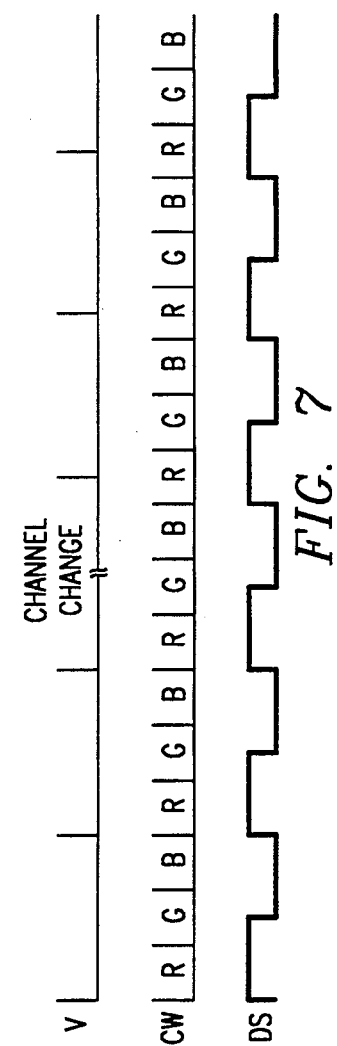
FIG. 7 illustrates the drive signal produced by the motor control unit of FIG. 6, and near-constant phase relationship with the color wheel position.

FIG. 7 illustrates the same channel changing event as FIG. 3, but with a color wheel position that avoids the transient period. FIG. 6 also illustrates the drive signal, DS, which is generated by motor control unit 15b. As a result of the use of the horizontal sync signal to drive motor 16a, when a phase changing event occurs, the drive signal continues to be generated without a significant discontinuity. The transient time is limited to the line period rather than the frame period of the signal. In other words, the maximum disruption is the period of time between two horizontal sync pulses, which for a 525 line frame, is in the order of 64 microseconds.

Another advantage of the motor control unit 15b, is the ability to re-synchronize color wheel 14a to the vertical sync signal. Referring again to FIG. 3, after a phase changing event, in general, the color wheel 14a is not in phase with the vertical sync signal. In systems in which the write pointer is driven by the vertical sync signal, this can result in situations in which the read pointer is at the end of the currently displayed frame, while the write pointer is at the beginning of the next frame. This results in maximum use of memory space. However, if the phase of color wheel 14a can be incrementally matched to the phase of the vertical sync signal, the read pointer and write pointers could be brought closer together. This is accomplished with small changes to the drive waveform period, such as by incrementally increasing or decreasing the n-value of counter 65 until the desired phase relationship is reached. To optimize memory use, a situation could be maintained where the read pointer were positioned so that each section of memory 13b was half-full at any given time.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A color-wheel motor control unit for a display system that uses a motor-driven color wheel, to display frames of color images from a video signal having a horizontal sync signal and a vertical sync signal, comprising:

an oscillator for receiving the horizontal sync signal and for generating a first pulsed signal having a frequency of said horizontal sync signal times a frequency multiplier;

a divide-by-n counter for receiving said first pulsed signal from said oscillator, and for dividing said first pulsed signal by a value equal to the number of lines in each frame, such that it generates a frame-pulsed signal;

a second divide-by-n counter for receiving said frame-pulsed signal and for dividing said frame-pulsed signal by a predetermined frequency divider, such that it generates a square wave signal having a period equal to that of said vertical sync signal; and a spatial light modulator display, wherein said display uses said frame-pulsed signal to synchronize said color wheel with video data for said spatial light modulator.

2. The motor control unit of claim 1, wherein said oscillator generates said first pulsed signal with a frequency of four times that of said horizontal sync signal, and wherein said second divide-by-n counter divides said frame-pulsed signal by two.

3. The motor control unit of claim 1, wherein said oscillator is a voltage controlled oscillator.

4. The motor control unit of claim 1, and further comprising means for converting said square wave signal to two out-of-phase signals for driving a phase motor.

5. The motor control unit of claim 1, wherein said second divide-by-n counter is a Johnson counter for providing two square wave signals.

6. The motor control unit of claim 1, wherein said first divide-by-n counter may be changed to more than one value of n.

7. A method of providing a drive signal for a color-wheel motor for a display system that uses a motor-driven color wheel to display frames of color images from a video signal having a horizontal sync signal and a vertical sync signal, comprising the steps of:

converting the horizontal sync signal to a first pulsed signal having a frequency of said horizontal sync signal times a frequency multiplier;

dividing said first pulsed signal by a value equal to the number of lines in each frame to generate a frame-pulsed signal;

dividing said frame-pulsed signal by a predetermined frequency divider to generate a square wave signal having a period equal to that of the vertical sync signal, wherein said divider value operates to change the phase of said square wave, and said change is repeated to incrementally obtain a desired phase relationship between said square wave and said vertical signal; and driving the color wheel motor with a drive signal derived from said square wave.

8. The method of claim 7, wherein said frequency multiplier is four and said frequency divider is two.

9. The method of claim 7, and further comprising the step of dividing said square wave signal into two out-of-phase square wave signals.

* * * * *

UNITED STATES PATENT AND TRADEMARK OFFICE
CERTIFICATE OF CORRECTION

PATENT NO. : 5,365,283

DATED : November 15, 1994

INVENTOR(S) : Doherty et al

It is certified that error appears in the above-identified patent and that said Letters Patent is hereby corrected shown below:

On the title page, item [75] inventor "Jeffrey B. Sampsell" and "Donald B. Doherty" should be deleted.

Signed and Sealed this

Twenty-first Day of May, 1996

*Attest:*

BRUCE LEHMAN

*Attesting Officer*  *Commissioner of Patents and Trademarks*